INVENTOR
CHARLES ALAN CLEGG

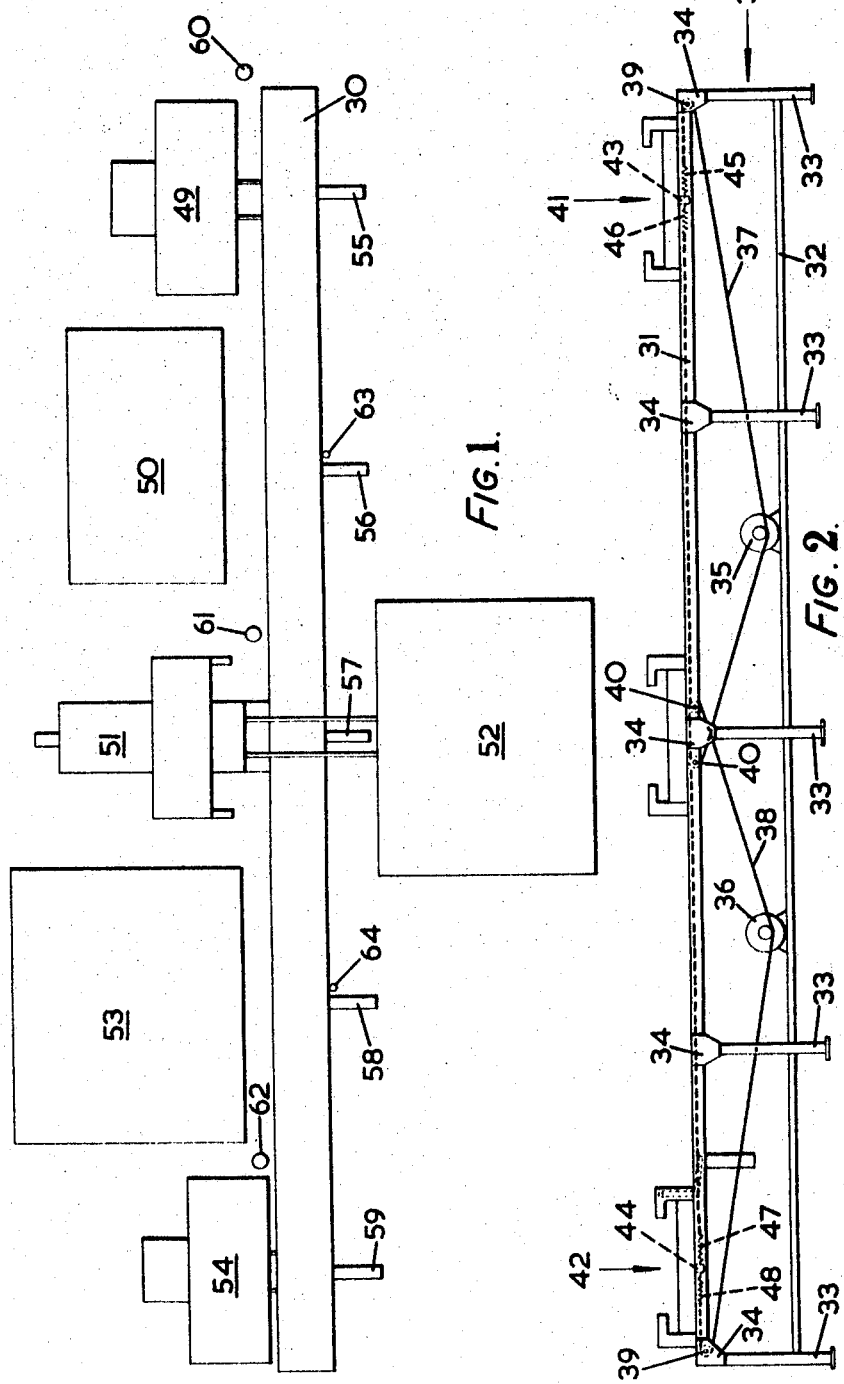

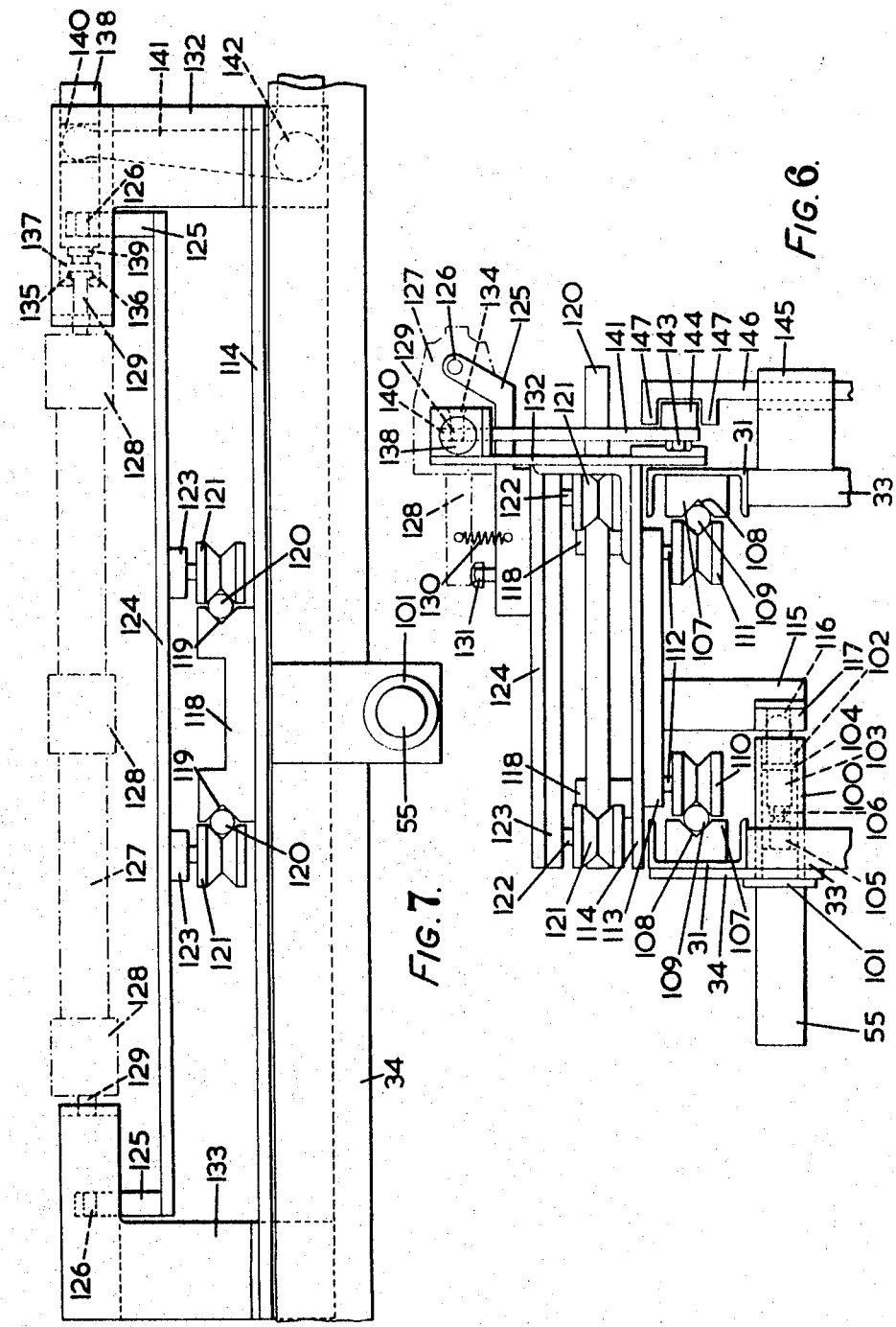

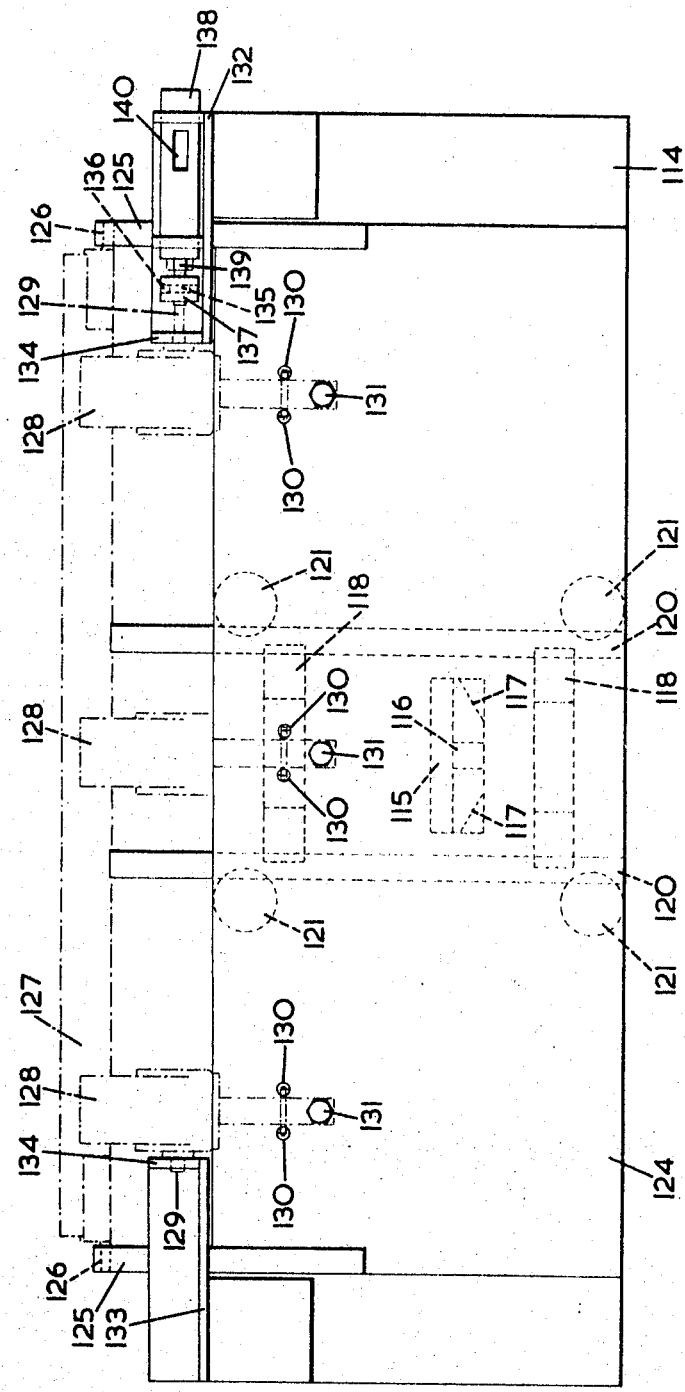

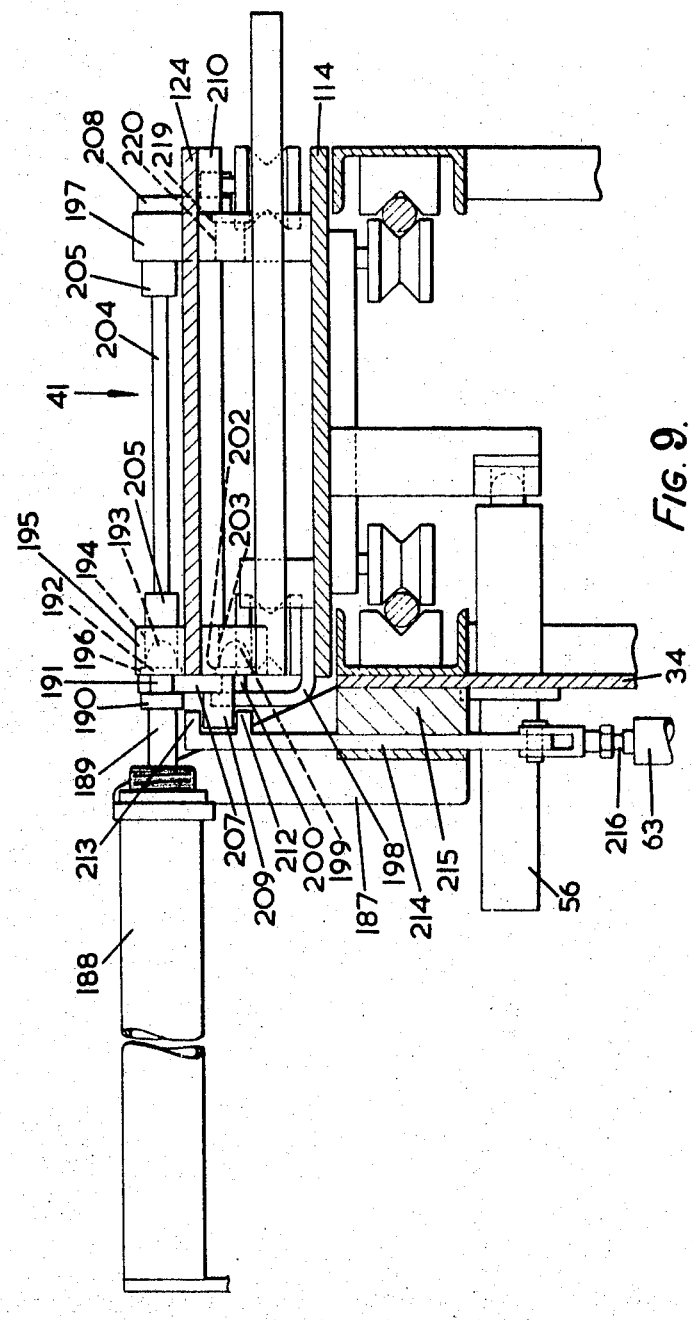

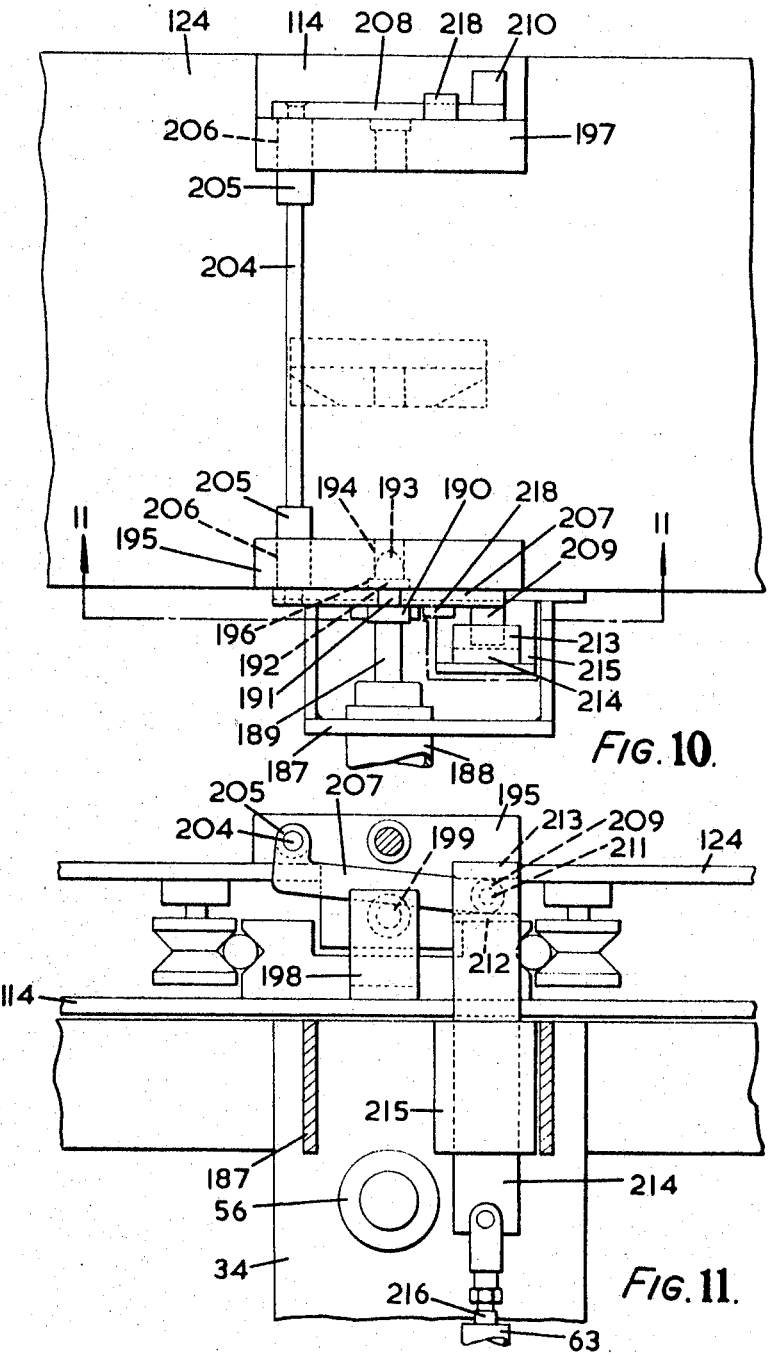

INVENTOR
CHARLES ALAN CLEGG

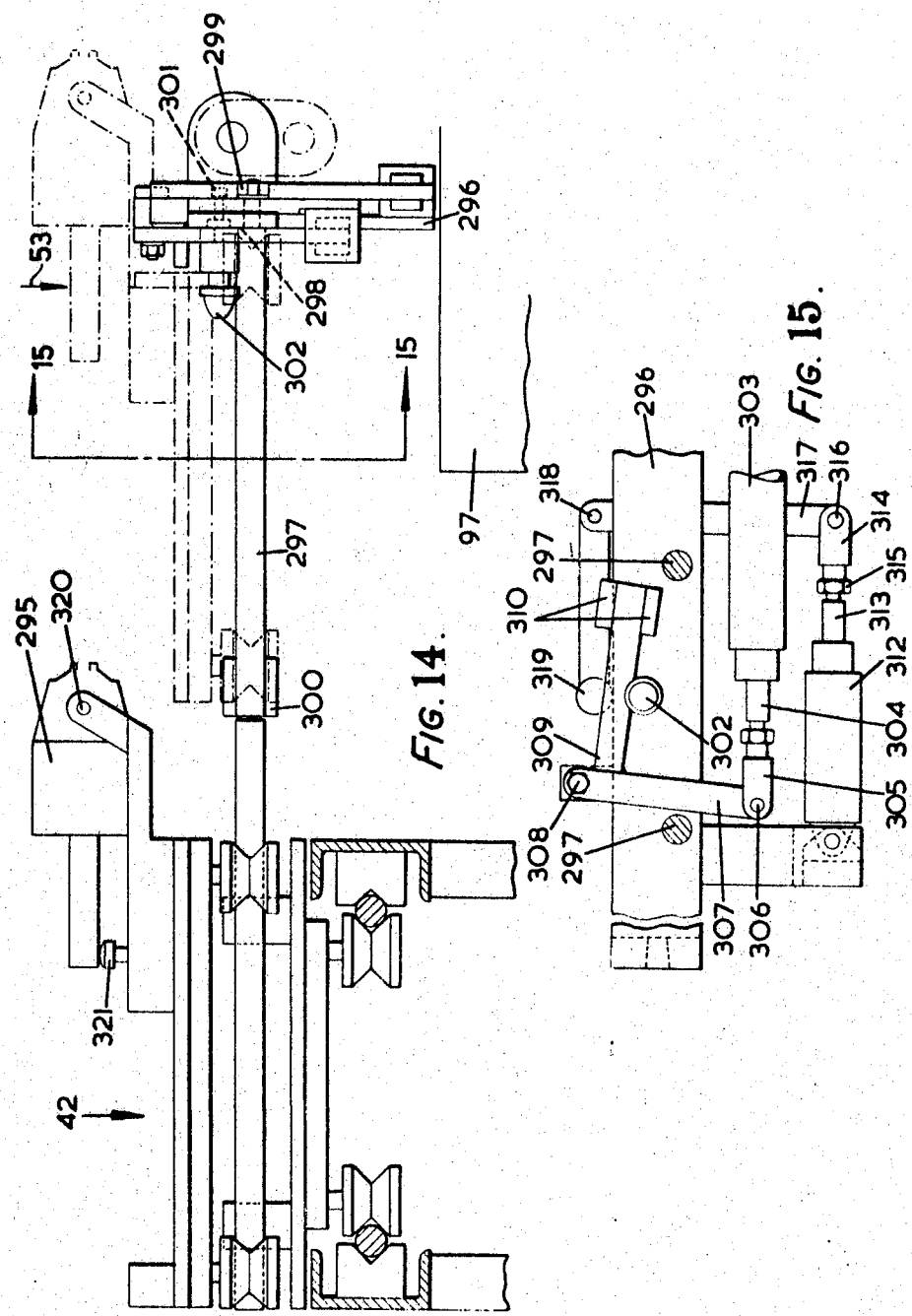

United States Patent Office 3,459,288
Patented Aug. 5, 1969

3,459,288
PLATEN ASSEMBLY AND A CONVEYOR SYSTEM UTILISING THE SAME
Charles Alan Clegg, London, England, assignor to Clairpol (Machines) Limited, London, England
Filed Sept. 7, 1967, Ser. No. 666,168
Claims priority, application Great Britain, Sept. 8, 1966, 40,159/66
Int. Cl. B65g; B23q 7/00, 5/22
U.S. Cl. 198—19                12 Claims

ABSTRACT OF THE DISCLOSURE

In a conveyor system a conveyor track leads from an article loading station past a machine to an article unloading station. The machine has a machine track directed transversely to the conveyor track at a work station. A platen assembly has a first portion supported for longitudinal movement along the conveyor track and is stopped at each station. A second platen portion is supported by the first platen portion so that, after the platen assembly has been locked at the work station, the second platen portion is moved transversely off the first platen portion onto the machine whereby articles supported by the second platen portion are presented to the machine for a machine operation to be performed thereon.

---

This invention relates to a platen assembly for supporting and transporting an article or a side-by-side array of articles along a conveyor track between successive machines or work stations, for operations to be performed on each article, and also to a conveyor system utilising the platen assembly.

Particularly, but not exclusively, the invention is concerned with a part of conveyor system between machines for performing surface finishing treatments, such as polishing, grinding or scratch brushing on small articles, for example cutlery.

Articles mounted on platens for transport along a conveyor track are often at too great a distance from each machine or are at an unsuitable position or inclination for each operation to be performed. To unload the articles from the platens onto the machines and back onto the platens involves manual labor and is time consuming and precludes the automatic operation of large sections of the overall process. An object of the invention is to mitigate these disadvantages.

According to the invention, a conveyor system, for use with a machine which has a track that is to be directed transversely to a conveyor track at a work station, includes a platen assembly having a first portion which is supported for longitudinal movement along the conveyor track and a second portion which is for carrying the articles and is supported from the first portion for transverse movement relatively to the conveyor track, whereby the said second portion of the platen assembly is movable, when at the work station, between the first portion and a position on the machine track where the articles are engaged with the machine for an operation to be performed.

According to another feature, the conveyor system include means for releasably locking the second portion of the platen assembly optionally to the first portion or to part of a transversely operable actuator means or to the machine, and means for releasably locking the first portion of the platen to the conveyor track at each work station or transfer station. Preferably the conveyor system includes a clamping means for gripping a plurality of articles when the platen assembly is to be loaded at a loading station and for releasing the articles when the platen assembly is to be unloaded at an unloading station or at a transfer station.

According to a further feature, at each station at which the clamping means of the platen assembly is to be operated for gripping or releasing articles, an actuator may be provided to react on the conveyor track and adapted to move vertically a member formed with a longitudinally directed slot open at both ends and one side, and a roller, pivoted on part of a means carried by the platen for opening and closing the clamping means, is arranged such that the roller will be disposed within the slot when the platen is at the station, whereby operation of the actuator will open or close the clamping means.

According to yet another feature the clamping means for gripping the articles on the second portion of the platen assembly may be pivotable about an axis longitudinal to the conveyor track whereby the articles may be inclined for easy engagement with a machine for an operation to be performed, and the first portion of the platen includes means for engagement with part of the clamping means, whereby the clamping means is inhibited from tilting when the second portion of the platen is supported by the first portion. Preferably the conveyor system includes an actuator for tilting the said clamping means to a suitable angle before the articles are engaged with the machine.

According to another feature, the conveyor system may include a first latching lever pivotally supported by the said second portion of the platen assembly for optional engagement with a first abutment fast with the said first portion or with a second abutment fast with the said part of the transversely operable actuator means, for locking the said first portion to the said second portion whilst unlocking the latter from the part of the transversely operable actuator means, or alternatively for locking the latter to the second portion whilst unlocking the second portion from the first portion.

According to a further feature, the conveyor system may include a second latching lever pivotally supported by the second portion for engagement with an abutment fast with a part of a machine, the second latching lever being operatively connected to the said first latching lever whereby when the said second portion is locked to the machine, the second portion is unlocked from the part of the transversely operable actuator means. Preferably the said first and second latching levers are disposed adjacent the sides of the second portion of the platen assembly respectively further from and nearer to the machine, and an actuator means reacting on a stationary part of the conveyor track is arranged to be engaged with a means adapted for operating the first latching lever when the said second portion of the platen assembly is in a lockable position on the first portion, and an actuator means reacting on part of the machine is arranged to engage a means for operating the second latching lever when the second portion is on the machine or work station.

According to yet another feature the part of the means for opening and closing the jaws of the clamping means carried by the first portion of the platen assembly may be operatively engaged with the part carried by the second portion of the platen assembly only when the second portion is in a position to be lockable to the first portion.

According to another feature the platen assembly may be movable along the conveyor track by a flexible member driven by an electric motor, each end of the flexible drive member is connected to the said first portion of the platen assembly by an extensible member, and adjacent each station a transversely operable actuator is arranged for moving a plunger into slidable engagement with a bore formed in part of the said first portion, the part being formed with a ramp longitudinally disposed each side of the bore, such that when the plunger is extended as the platen moves towards the stations one or other of the ramps will engage the plunger and urge it to retract against the bias of the actuator, until the plunger becomes aligned with and enters the bore, whereby the platen will be accurately longitudinally located.

One embodiment of the invention as specifically applied to apparatus for polishing cutlery spoons is illustrated, by way of example only, in the accompanying drawings.

In the accompanying drawings:

FIGURE 1 is a diagrammatic plan view of the whole system illustrating the disposition of the component machines;

FIGURE 2 is a diagrammatic elevation of the whole system;

FIGURE 6 is an end elevation of the conveyor track and a compound platen assembly mounted thereon for holding and transporting the spoons;

FIGURE 7 is a front elevation of FIGURE 6;

FIGURE 8 is a plan of the compound platen assembly shown in elevation in FIGURE 6;

FIGURE 9 is a transverse section of the conveyor track and compound platen assembly when locked at the polishing machines shown in FIGURES 3 or 5;

FIGURE 10 is a part plan view of FIGURE 9;

FIGURE 11 is a section along the line 11—11 in FIGURE 10;

FIGURE 14 is an elevation of the compound platen assembly and part of the polishing machine shown in FIGURE 5, and FIGURE 15 is a section along the line 15—15 in FIGURE 14.

Figure 3:
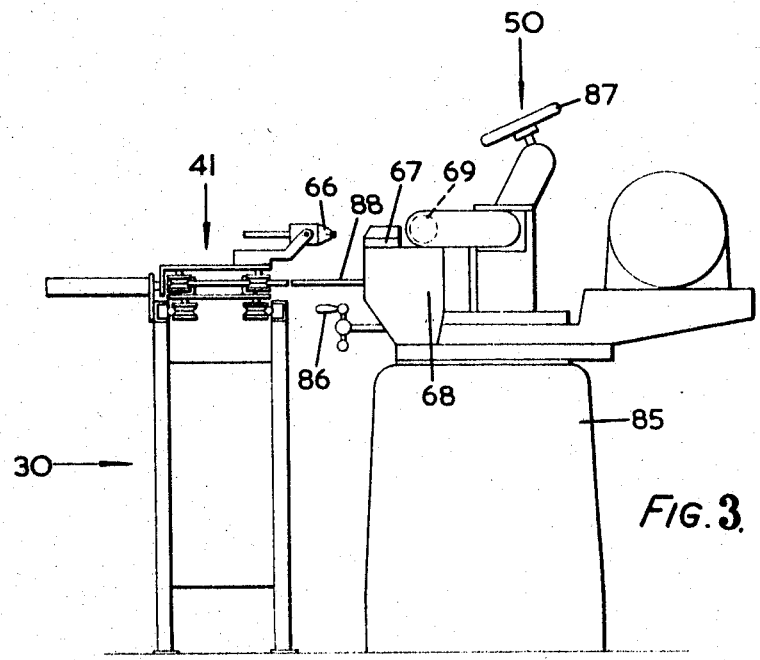
FIGURES 3, 4 and 5 show end elevations of machines for performing three polishing processes and the relationship of the three machines to a common conveyor track.

Referring to FIGURES 1 and 2, a conveyor track 30 includes a pair of longitudinal mild steel upper rails 31 of U-section, a pair of longitudinal mild steel lower rails 32 of L-section, legs 33 and stiffening plates 34. Unseen rails attached transverse to the lower rails 32 support a first electric motor 35 and a second electric motor 36 each of the kind which is reversible and is automatically braked to rest when the current is switched off. The electric motors 35 and 36 drive cables 37 and 38 respectively, each passing around one of two pulleys 39 at opposite ends of the conveyor track; and around one of two further pulleys 40 positioned so that the cables 37 and 38 partially overlap.

Supported by the conveyor track 30 are first and second platen assemblies 41 and 42 to which are fastened, by screws, brackets 43 and 44 attached to the cables 37 and 38 by helically coiled tension springs 45, 46, 47 and 48 whereby limited longitudinal movement is possible between the platen assemblies and the respective driving cables.

A spoon loading machine 49 is situated at the right hand side of the conveyor track 30 at the end where the polishing operations will commence. Adjacent to the spoon loading machine 49 and on the right hand side of the conveyor track 30 is an initial spoon bowl polishing machine 50 followed on the same side by a transfer station 51 opposite a spoon handle polishing machine 52. Next after the transfer station 51 on the right hand side of the conveyor track 30 is a final spoon bowl polishing machine 53, adjacent to which, at the end of the conveyor track 30, is a spoon unloading station 54.

Aligned with each machine or station are identical transversely operable pneumatic cylinders 55, 56, 57, 58 and 59 for locking the lower part of the platen assemblies 41 and 42 to the conveyor track. Adjacent the loading machine 49, the transfer station 51 and the unloading station 54 are identical vertically operable pneumatic cylinders 60, 61 and 62 respectively for operating spoon holding jaws. Positioned opposite the initial and final bowl polishing machines 50 and 53 are identical vertically operable pneumatic cylinders 63 and 64 for operating locks to interconnect parts of the platen assemblies 41 and 42. The detailed operation of these pneumatic cylinders will be described later.

Referring to FIGURE 3, the relationship of the initial bowl polishing machine 50 to the conveyor track 30 is shown. The details of construction of the polishing machine are not relevant to this description but it includes a base 85, a machine bed 68, a supporting pad 67, a polishing member 69, handles 86 and 87 for setting the adjustments of the machine and a pair of bars 88, supported from the machine bed for alignment with similar bars forming part of the first platen assembly, to be described later. Also seen in FIGURE 3 are rubber lined jaws 66 and the first platen assembly 41.

Figure 4:
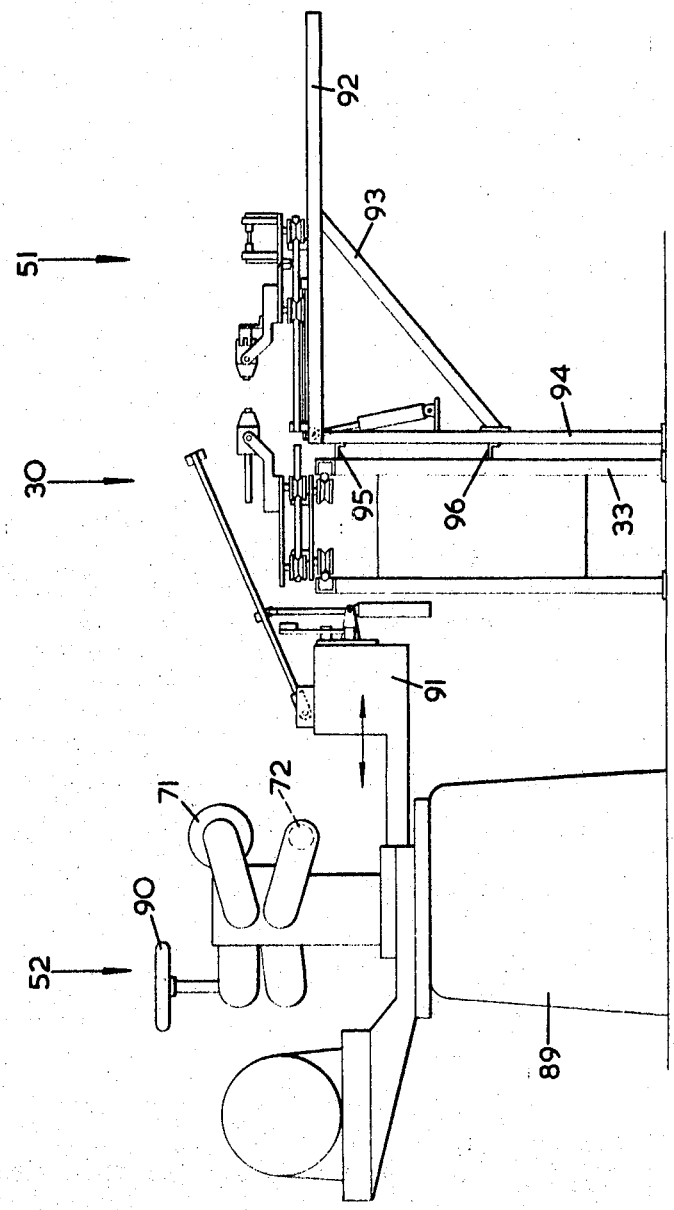

Referring to FIGURE 4, the relationship is shown of the transfer station 51, the spoon handle polishing machine 52 and the conveyor track 30. Again the details of the polishing machine are not relevant to this description but it includes a base 89, an adjusting handle 90, polishing members 71, 72 and a reciprocable machine bed 91. The frame of the transfer station 51 includes horizontal members 92 arranged transverse to the conveyor track 30 and supported by diagonal members 93 and upright members 94, all formed of L-section mild steel and bolted to brackets 95, 96 welded to legs 33 of the conveyor track 30.

Figure 5:
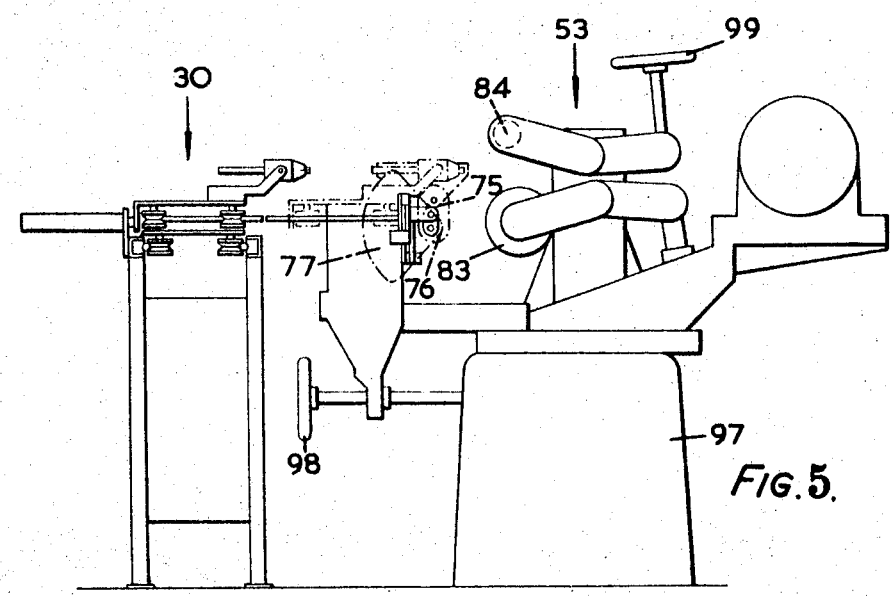

Referring to FIGURE 5, the relationship is shown between the conveyor track 30 and the final spoon bowl polishing machine 53. Again the details of the polishing machine are not relevant to this description but it includes a base 97, adjusting handles 98, 99, polishing members 83, 84 and a quadrant 77 and gear wheels 75 and 76.

Referring to FIGURES 6, 7 and 8, the upper rails 31 of the conveyor track 30 are welded to the legs 33 and to the stiffener plate 34 through a bore in which protrudes a tube 100 fast with the first pneumatic lower platen locking cylinder 55 held by an integrally formed flange 101 and unshown screws to the stiffener plate 34. A bush 102 pressed into the open end of the tube 100 supports for axial sliding a plunger 103 whose outwards travel is arrested when an integrally formed flange 104 reaches the adjacent end of the bush 102. The plunger 103 is screwed at one end on the piston rod 105 and locked by a nut 106, the other end of the plunger 103 is of hemispherical form.

Fastened by unshown countersunk socket screws inside the U-section of each upper rail 31 are a number of longitudinally spaced, transversely extending mild steel blocks 107. In the vertical inwardly facing faces of each of these is formed a longitudinally directed V-section groove 108. Fastened to the blocks 107 by unshown countersunk socket screws and located by the V-grooves 108 are longitudinally extending round section bright drawn mild steel bars 109 of such diameters that their centres lie just outside the V-grooves 108 and of such diameter that they are stiff enough to carry the load of the first and second platen assemblies 41, 42. Each of the latter platen assemblies has a pair of wheels 110 engaging the one bar 109 and another pair of wheels 111 engaging the other bar 109. The wheels have peripheral V-shape grooves whereby the wheels are constrained for rolling along the bars. Each wheel is supported by a pair of unshown combined journal and thrust ball races on a pin 112 screwed into a pair of transversely extending mild steel rails 113 screwed to which is an aluminium plate 114. This latter assembly together with components attached thereto constitute a lower platen.

Screwed to the aluminium plate 114 and dependent from it, a steel block 115 has a transverse bore 116 in which the plunger 103 is a sliding fit, and is chamfered to form ramps 117 so that when the lower platen locking cylinder 55 is energised with compressed air and the plunger 103 fully protrudes, as the lower platen is moved longitudinally, one of the ramps will force the plunger 103 to retract, against the air pressure, until the plunger 103 is aligned with the bore 116 when it will extend and lock the lower platen against further movement.

Screwed to the upper surface of the aluminium plate 114 are two longitudinally extending mild steel blocks 118 in each end face of which is formed a transversely directed V-groove 119 for the location of a pair of transversely extending round section bright drawn mild steel bars 120 fastened to the blocks 118 by unseen countersunk socket screws. Arranged for transverse rolling on each bar is a pair of wheels 121 whose periphery is formed with a V-shaped groove for engaging the bars, and rotatably supported by unseen combined journal and thrust ball races on pins 122 screwed into a further pair of transversely extending mild steel rails 123 on which is screwed a further horizontal aluminium plate 124. Held by screws to the upper face of the aluminium plate 124, one at each end, are two transverse mild steel brackets 125 in which longitudinal bores 126 are formed to support spigots forming part of a jaw assembly 127 shown chain dotted in FIGURES 6, 7 and 8. The jaw assembly 127 includes rubber lined jaws, three clamping means 128 and a longitudinal push-pull rod 129 for simultaneously operating the clamping means 128. A jaw assembly of this type is described in our United States Patent No. 3,121,564.

Pairs of helically coiled tension springs 130 acting between the aluminium plate 124 and each clamping means 128 bias the latter against adjustable stops 131 screwed into the aluminium plate 124. The upper aluminium plate 124 and components attached thereto constitute an upper platen. Brackets 132, 133 formed of mild steel plate and screwed to the lower aluminium plate 114 extend upwardly and have slots 134 closed at one end for engaging extensions of the push-pull rod 129 whereby, when the upper platen is in situ on the lower platen, the jaw assembly is inhibited from rotation in the bores 126.

One end of the push-pull rod 129 has a disc 135 integrally formed perpendicular to the rod axis for sliding engagement in a transversely disposed T-section slot 136 formed in a mild steel block 137 screwed into one end of a cylindrical plunger 138 and locked by a nut 139. By this means the push-pull rods 129 may be disengaged from the plunger 138 by transverse movement, but when engaged, axial movement of the plunger 138 will operate the push-pull rod 129. The plunger 138 is supported for longitudinal sliding by the bracket 132 and has a vertically extending slot 140 in which is engaged the partially circular upper end of a bell crank lever 141, rotatable on a pivot 142 on the bracket 132. Screwed into the other end of the bell crank lever 141 is a pin 143 supporting a co-axial roller 144. A bracket 145 fast with a leg 33 of the conveyor track 30 carries the first jaw opening pneumatic cylinder 60 whose piston rod 146 is formed at its upper end with longitudinally disposed ribs 147 at levels above and below the roller 144. The jaw opening cylinder 60 is longitudinally located so that when the lower platen is locked by the first lower platen locking cylinder 55, operation of the jaw opening cylinder 60 will move the ribs 147 vertically to engage the roller 144 whereby the bell crank lever 141 will be rotated to slide the plunger 138 and operate the push-pull rod 129, if its end disc 125 is engaged with the T-slot 136.

Referring to FIGURES 9, 10 and 11, the first platen assembly 41 is shown in the longitudinal position on the conveyor track 30 corresponding to the initial spoon bowl polishing machine 50 and located by the plunger of the second lower platen locking cylinder 56. A mild steel bracket 187 welded to a stiffener plate 34 carries a first pneumatically operable double-acting transfer cylinder 188 whose piston rod 189 is formed at the protruding end with a latching plug comprising a collar 190, a groove 191, a second collar 192 and a rounded nose 193 whereby, as the piston rod is extened, the nose 193 is easily aligned to enter a bore 194 formed in a steel block 195 until the collar 192 is fully engaged in a larger bore 196 coaxial with the bore 194. The block 195 is held by screws to the upper surface of the upper aluminium plate 124 of the first platen assembly 41. A bracket 198 screwed to the upper surface of the lower aluminium plate 114 of the first platen assembly 41 is riveted to another latching plug 199 formed identical to the end of the piston rod 189 so that their grooves 191 and 200 are vertically aligned and coplanar. Further bores 202, 203 are arranged in the block 195 for engagement with the latching plug 199.

A transversely disposed steel rod 204 and sleeves 205 fast therewith are pivotally supported in bores 206 in the blocks 195, 197. Fast with the ends of the rod 204 are the ends of cranked steel levers 207, 208. The other ends of the levers carry rollers 209, 210 pivotally supported on pins 211. Above and below the roller 209 are longitudinally disposed horizontal ribs 212, 213 integral with a rectangular section steel plunger 214 slidable, in a block 215 screwed to the stiffener plate 34, by the piston rod 216 of the pneumatic double-acting first platen interlocking cylinder 63. The lever 207 is of suitable thickness for easy engagement into the grooves 191, 200 whereby, when the cylinder 63 is energised to retract the piston rod 216 the lever 207 will be pulled down to engage the groove 191 to lock the upper platen to the lower platen, and when the cylinder 63 is energised to extend the piston rod 216, the lever will be raised to engage the groove 200 to unlock the lower platen from the upper platen and to lock the latter to the piston rod 189 of the first transfer cylinder 188. As the lever 207 is moved, the lever 208 will be moved with it and stops 217, 218 limit their travel if they engage no other member. At the upper and lower stopped positions unshown coiled compression springs and plungers acting in bores in the block 197 co-act with detents in the lever 208 to inhibit accidental displacement of the lever from the stopped positions. Formed in the block 197, coaxial and identical to the bores 202 and 203 are bores 219 and 220 respectively.

Figure 12:
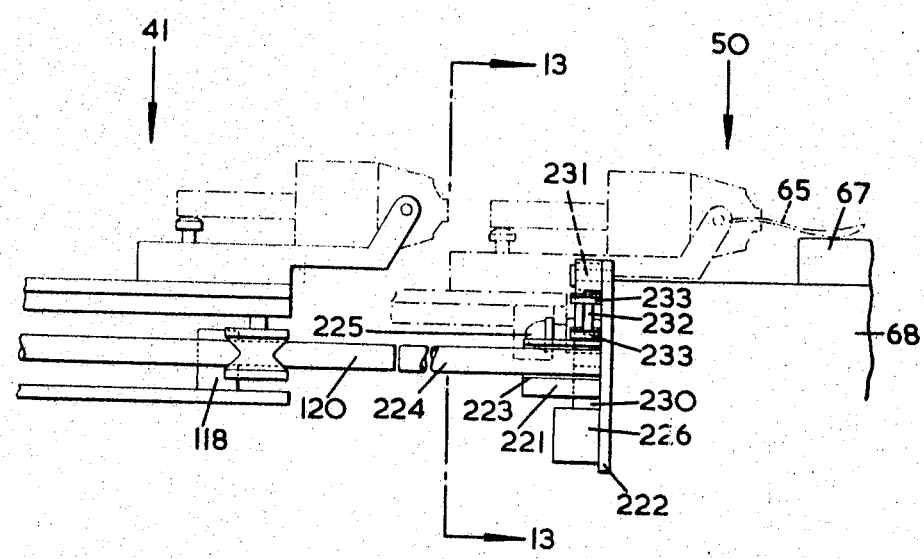
FIGURE 12 is an elevation of part of the compound platen assembly and part of the machines shown in FIGURE 3.
Figure 13:
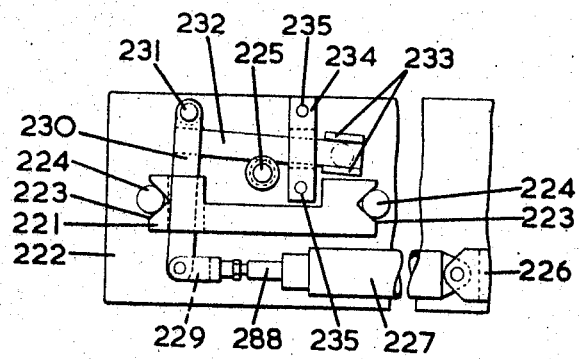
FIGURE 13 is a section along the line 13—13 in FIGURE 12.

Referring to FIGURES 12 and 13, as in FIGURES 9, 10 and 11, the first platen assembly 41 is shown locked in the position for co-action with the initial spoon bowl polishing machine 50. A steel block 221 is screwed to a steel plate 222 which is in turn screwed to the bed 68 of the polishing machine 50. Formed in the end faces of the block 221 are V-section grooves 223 in which a pair of parallel round section bright drawn steel bars 224 are held by unshown countersunk socket headed screws. The bars 224 are of such length, diameter and position that they extend from the steel plate 222 to the end adjacent the corresponding transverse bars 120 of the first platen assembly 41 whereby the upper platen may be traversed from the lower platen on to the polishing machine 50 until the block 118 abuts the block 221. A further latching plug 225 fast with the plate 222 engages the bores 219 and 200 in the block 197.

Pivoted on a bracket 226 fast with the plate 222 is a double-acting pneumatically operable initial polishing machine locking cylinder 227 on the piston rod 228 of which is screwed a forked clevis 229 pivoted on one end of a lever 230 whose other end is pivoted on a pin 231 screwed into the plate 222. An arm 232 welded at one end perpendicular to the lever 230 has longitudinal ribs 233 welded on the other end. The travel of the lever 230 and arm 232 are limited by a steel strap 234 held to the plate 222 by screws 235. The spacing and position of the ribs 233 is arranged so that when the roller 210 shown in FIGURE 9 is in the position corresponding to the upper platen being locked to the piston rod 189, and the arm 232 is held against its stop by the piston rod 228 being retracted, the roller 210 will come between the ribs 233 as the upper platen abuts the polishing machine 50. If the cylinder 27 is then energised to extend the piston rod 228, the ribs 233 will be lowered with the roller 210 to rotate the levers 207, 208 so that the lever 207 moves out of the groove 191 to unlock the upper platen from the piston rod 189, and the lever 208 moves into the groove 236 of the latching plug 225 to fasten the upper platen to the polishing machine 50 so that the spoon 65 is constrained to rest on the support pad 67.

Referring to FIGURES 14 and 15, the second platen assembly 42 is movable longitudinally along the conveyor track 30 by the second electric motor 36, the second cable 38 and the tension springs 47, 48 between the spoon handle polishing machine 52 and the spoon unloading station 54. The second platen assembly 42 is identical in every respect to the first platen assembly 41 and comprises a second upper platen and a second lower platen. The second platen assembly 42 includes transverse bars 294 on which the upper platen is movable and a jaw assembly 295.

FIGURE 14 shows the second platen assembly 42 locked by operation of the fourth lower platen locking cylinder 58 to be aligned for cooperation with the final spoon bowl polishing machine 53. A mild steel frame 296, fast with the quadrant 77, is pivoted to the machine base 97. A pair of transverse bars 297 identical in material, diameter and spacing to the transverse bars 294 are of reduced diameter and threaded at one end whereby the frame 296 is fastened between the shoulders 298 thereby formed and nuts 299 screwed on the threaded portions. A longitudinal steel block 300 formed with V-section grooves in the end faces is screwed to the bars 297 near their other end. Attached to the frame 296 by a screw 201, a latching plug 302 is arranged for engagement with corresponding bores in part of the upper platen. Pivoted to the frame 296 at one end, a double-acting pneumatical final spoon bowl polishing machine locking cylinder 303 has a piston rod 304 pivoted by a clevis 305 and pin 306 to one end of a steel lever 307 whose other end is pivoted by a pin 308 to the frame 296. Welded at one end and at right angles to the lever 307 an arm 309 is formed at the other end with two substantially longitudinally disposed ribs 310. The unlocking, by a second platen interlock cylinder 64, of the second upper platen from the second lower platen and the locking of the upper platen to the piston rod of a third transfer cylinder 311, the transfer of the platen to the final bowl polishing machine 53, the unlocking, by the locking cylinder 303, of the upper platen from the piston rod and the locking of the upper platen to the polishing machine 53 are all performed in a manner identical to that of the corresponding parts of the first platen assembly 41 and the initial spoon bowl polishing machine 50 described with reference to FIGURES 9, 10, 11, 12 and 13.

A double-acting pneumatically operable height-adjusting cylinder 312, pivoted at one end to the frame 296 has a piston rod 313 screwed into a clevis 314 locked by a nut 315. The clevis 314 is pivoted by a pin 316 to one limb of a bell crank lever 317 which is pivoted by a pin 318 to the frame 296. The end of the other limb of the bell crank lever 317 carries a roller 319. When the height-adjusting cylinder 312 is energised with compressed air to retract the piston rod 313, the roller 319 will be raised into engagement with the underside of the jaw assembly 295 whereby the latter will be pivoted about the spigot 320, away from the stop 321 so that the spoon bowls may be introduced between the polishing members 83 and 84 at a favourable inclination and position.

The order and timing of the operation of the various pneumatic cylinders and the electric motors is controlled by an unshown sequencing valve and switch and by an operator controlled stop/start switch.

Most of the pneumatic operating cylinders have been described as if working on the double-acting principle, but they could be worked on the single-acting principle in conjunction with a return spring between each piston and cylinder whereby to exhaust the latter when it is de-energised and to move the associated mechanisms.

Although the operating medium has been described as compressed air, the actuators, instead of pneumatic cylinders could be hydraulic cylinders or electro-magnetic devices, either working on the double-acting or single-acting principles.

What I claim as my invention and desire to secure by Letters Patent of the United States is:

1. A conveyor system, for use with a machine having a track for the conveyance of articles to the machine, comprising a conveyor track, a platen assembly supported for longitudinal movement along said conveyor track, article supporting means carried by said platen assembly, and means for conveying said platen assembly longitudinally along said conveyor track to said machine track, said conveyor track directed transversely to said machine track, the juncture of the conveyor track with the machine track being a work station on said conveyor track, said platen assembly comprising a first platen portion and a second platen portion, means supporting said first platen portion for longitudinal movement along the conveyor track, said article supporting means carried by said second platen portion, means supporting said second platen portion from said first platen portion for transverse movement relative to said conveyor track in the direction of said machine track, and means for stopping said platen assembly at said work station whereby said second platen portion is movable along said machine track between said work station and a position on said machine track where an article carried by said article supporting means will be engaged with said machine for an operation to be performed, wherein the invention comprises an actuator means having a first part secured to the conveyor track at the work station and a second part operable transversely to the conveyor track, locking means operable to one condition for releasably locking the second platen portion to the first platen portion for movement along the conveyor track, to another condition for releasably locking the second platen portion to the second part of the transversely operable actuator means for movement along the machine track, and to a further condition for releasably locking the second platen portion to the machine for the operation to be performed on the article.

2. A conveyor system, as in claim 1, in which the locking means comprises a first abutment means fast with the first platen portion, a second abutment means fast with the said second part of the transversely operable actuator means, a latching lever pivoted to the second platen portion for movement between one position and another position, the latching lever whilst said second platen portion is supported by said first platen portion being arranged to engage the first abutment means when the latching lever is in its said one position and being arranged when the first platen is at the work station to engage the second abutment means when the latching lever is in its said another position, whereby the engagement of the latching lever with the second abutment means will lock the second platen portion to the second part of the transversely operable actuator means and will release the second platen from the first platen portion so that the second platen portion can be moved along the machine track by said actuator means, and the engagement of the latching lever with the first abutment means, after the second platen portion has been returned to the first platen portion by said actuator means, will lock together the first and second platen portions and will release the second platen portion from the second part of the transversely operable actuator means so that the platen assembly can be moved along the conveyor track.

3. A conveyor system, as in claim 2, in which the locking means further comprises a third abutment means fast with a part of the machine, a second latching lever pivoted to the second platen portion for movement between a first position and a second position, means operatively connecting said second latching lever to the first aforesaid latching lever for the second latching lever to be in the said first position whenever the first latching lever is in its said one position and for the second latching lever to be in its said second position whenever the first latching lever is in its said another position, the second latching means is arranged whenever it is pivoted to its said second position to disengage said third abutment means, and the second latching means is arranged whenever it is pivoted to its first position whilst the second platen portion is in the aforesaid position on the machine track to engage the third abutment means whereby the operation of the second latching lever to its first position will lock the second platen portion to the machine and the first latching lever will simultaneously be operated to its said one position to disconnect the second part of the transversely operable actuator means for the second platen portion.

4. A conveyor system, as in claim 3, in which the first latching lever is arranged adjacent one boundary of the second platen portion and the second latching lever is arranged adjacent another boundary of the second platen portion, said one boundary is positioned further away from the machine than said another boundary, a second actuator means has a first part secured to the conveyor track at the work station and a second part operable relatively to said first part, a third actuator means has a first part secured to the machine and a second part operable relatively to said first part, first operating means for said first latching lever arranged to be engaged by the second part of the second actuator means when the platen assembly is at the work station for operating the first latching lever between its said one and said another position and second operating means for said second latching lever arranged to be engaged by the second part of the third actuator means when the second platen portion is in the aforesaid position on the machine track for operating the second latching lever between its said first and said second positions.

5. A conveyor system, as in claim 4, including a flexible drive member, a first extensible member connecting one end of said flexible drive member to drive said platen assembly along said conveyor track in one direction, a second extensible member connecting the other end of said flexible drive member to drive said platen assembly along said conveyor track in the opposite direction, intermittently operable drive means for driving said flexible drive member optionally in either of said directions, means for stopping said intermittently operable drive means to arrest said platen assembly at said work station and substantially in alignment with said machine track within the resilient tolerance provided by said first and second extensible members, and location means for accurately aligning the platen assembly in alignment with said machine track and for releasably locking the platen assemby in the aligned position.

6. An conveyor system, as in claim 5, in which said location means comprises a location actuator means having a first part secured to the conveyor track at the work station and a second part operable transversely to the conveyor track, said first platen portion defining a locking bore directed transversely to the conveyor track, a plunger slidingly engageable with said bore, guide means for said plunger to be movable transversely from a position in which the plunger is disengaged from the bore and a position in which the plunger engages the bore and locks the first platen portion in a position in which the second platen portion is accurately aligned with said machine track, the second part of the location actuator means being arranged to operate said plunger, two ramps secured to the first platen and extending longitudinally one on either side of said bore and additionally projecting towards said plunger, and means for operating said location actuator means to extend said plunger to the position in which it would engage said bore before the platen assembly has stopped moving under the action of the intermittently operable drive means whereby the approaching ramp will engage the plunger and urge it to retract against the bias of the location actuator means until the plunger becomes aligned with and enters the bore so that the platen assembly will be accurately located longitudinally of the conveyor track at the work station.

7. A conveyor system, for use with a machine having a track for the conveyance of articles to the machine, comprising a conveyor track, a platen assembly supported for longitudinal movement along said conveyor track, article supporting means carried by said platen assembly, and means for conveying said platen assembly longitudinally along said conveyor track to said machine track, said conveyor track directed transversely to said machine track, the juncture of the conveyor track with the machine track being a work station on said conveyor track, said platen assembly comprising a first platen portion and a second platen portion, means supporting said first platen portion for longitudinal movement along the conveyor track, said article supporting means carried by said second platen portion, means supporting said second platen portion from said first platen portion for transverse movement relative to said conveyor track in the direction of said machine track, and means for stopping said platen assembly at said work station whereby said second platen portion is movable along said machine track between said work station and a position on said machine track where an article carried by said article supporting means will be engaged with said machine for an operation to be performed, wherein the invention comprises a flexible drive member, a first extensible member connecting one end of said flexible drive member to drive said platen assembly along said conveyor track in one direction, a second extensible member connecting the other end of said flexible drive member to drive said platen assembly along said conveyor track in the opposite direction, intermittently operable drive means for driving said flexible drive member optionally in either of said directions, means for stopping said intermittently operable drive means to arrest said platen assembly at said work station and substantially in alignment with said machine track within the resilient tolerance provided by said first and second extensible members, and location means for accurately aligning the platen assembly in alignment with said machine track and for releasably locking the platen assembly in the aligned position.

8. A conveyor system, as in claim 7, in which said location means comprises a location actuator means having a first part secured to the conveyor track at the work station and a second part operable transversely to the conveyor track, said first platen portion defining a locking bore directed transversely to the conveyor track, a plunger slidingly engageable with said bore, guide means for said plunger to be movable transversely from a position in which the plunger is disengaged from the bore and a position in which the plunger engages the bore and locks the first platen portion in a position in which the second platen portion is accurately aligned with said machine track, the second part of the location actuator means being arranged to operate said plunger, two ramps secured to the first platen and extending longitudinally one on either side of said bore and additionally projecting towards said plunger, and means for operating said location actuator means to extend said plunger to the position in which it would engage said bore before the platen assembly has stopped moving under the action of the intermittently operable drive means whereby the approaching ramp will engage the plunger and urge it to retract against the bias of the location actuator means until the plunger becomes aligned with and enters the bore so that the platen assembly will be accurately located longitudinally of the conveyor track at the work station.

9. A conveyor system, for use with a machine having a track for the conveyance of articles to the machine, comprising a conveyor track, a platen assembly supported for longitudinal movement along said conveyor track, article supporting means carried by said platen assembly, and means for conveying said platen assembly longitudinally along said conveyor track to said machine track, said conveyor track directed transversely to said machine track, the juncture of the conveyor track with the machine track being a work station on said conveyor track, said platen assembly comprising a first platen portion and a second platen portion, means supporting said first platen portion for longitudinal movement along the conveyor track, said article supporting means carried by said second platen portion, means supporting said second platen portion from said first platen portion for transverse movement relative to said conveyor track in the direction of said machine track, and means for stopping said platen assembly at said work station whereby said second platen portion is movable along said machine track between said work station and a position on said machine track where an article carried by said article supporting means will be engaged with said machine for an operation to be performed, including a first transfer station on said conveyor track spaced from said work station loading means at said first transfer station for transferring articles onto said article supporting means when said platen assembly is at said first transfer station, a second transfer station on said conveyor track spaced from said work station and said first transfer station, and unloading means at said second transfer station for transferring articles from said article supporting means when said platen assembly is at said second transfer station the article supporting means comprises a clamping means operable to an article gripping condition when the platen assembly is at the first transfer station, and said clamping means is operable to an article releasing condition when the platen assembly is at the second transfer station wherein the invention comprises a clamping actuator arranged at each station in which the clamping means is to be operated, each clamping actuator has a first part secured to the conveyor track at the corresponding station and a second part operable in a plane lying transverse to the conveyor track, an operating member arranged at each station and formed with a slot which is directed longitudinally of the conveyor track and is open at both ends and one side, said second part of each clamping actuator connected to operate the corresponding operating member from a first position to a second position, bias means urging said clamping means to its said article gripping condition, operating means arranged to operate said clamping means against the action of said bias means from said article gripping condition to said article releasing condition, said operating means carried by said platen assembly, an operating roller means for actuating said operating means supported by said operating means in a position which is longitudinally aligned with said slots in the operating members whenever said operating members are in their said first positions whereby, whenever the platen assembly is at a station in which the clamping means is to be operated, the operating roller will be disposed within the slot of the operating member arranged at the station, and the operation of the corresponding clamping actuator will cause the operating member to be moved to its second position for the operating roller to be correspondingly moved to actuate said operating means to operate said clamping means to its said article releasing condition.

10. A conveyor system, as in claim 9, including pivot means supporting said clamping means from said second platen portion for pivotal movement about an axis directed longitudinally of the conveyor track whereby each article supported by the clamping means may be orientated about said pivot means to facilitate their engagement with the machine for the operation to be performed, and an inhibitor means is carried by the first platen portion for engagement with said clamping means whenever the second platen portion is in position or said first platen portion to prevent any tilting of the clamping means about the pivot means until the second platen portion is moved off the first platen portion at said work station.

11. A conveyor system, as in claim 10, additionally comprising a tilting actuator having a first part connected to the second platen portion and a second part connected to the clamping means remote from said axis of the pivot means whereby the tilting actuator is operable whilst the second platen portion is on the machine track to tilt each article supported by the clamping means to a suitable attitude before engagement with the machine.

12. A conveyor system, as in claim 9, in which the operating means for operating the clamping means against the action of the bias means comprises a first portion carried by the first platen portion and supporting said operating roller, and a second portion carried by the second platen portion, disengageable connection means for operatively interconnecting the first and second portions of the operating means, and said disengageable connection means being engaged only when the second platen portion is fully supported by the first platen portion.

References Cited

UNITED STATES PATENTS

| 2,896,800 | 7/1959 | Thomas | 214—16.42 |
| 2,988,237 | 6/1961 | Devol | 214—16.42 |

RICHARD E. AEGERTER, Primary Examiner

U.S. Cl. X.R.

214—16